June 24, 1924.                  C. BROADWICK                  1,498,780
                                  PARACHUTE
                        Filed May 16, 1921      2 Sheets-Sheet 1

WITNESS

INVENTOR
CHARLES BROADWICK
BY
his ATTORNEYS

June 24, 1924.

C. BROADWICK

PARACHUTE

Filed May 16, 1921

1,498,780

2 Sheets-Sheet 2

WITNESS
A. E. Alberg.

INVENTOR
CHARLES BROADWICK
BY
White Prost & Evans
his ATTORNEYS

Patented June 24, 1924.

1,498,780

UNITED STATES PATENT OFFICE.

CHARLES BROADWICK, OF SAN FRANCISCO, CALIFORNIA.

PARACHUTE.

Application filed May 16, 1921. Serial No. 470,136.

*To all whom it may concern:*

Be it known that I, CHARLES BROADWICK, a citizen of the United States, and a resident of the city and county of San Francisco and State of California, have invented a new and useful Parachute, of which the following is a specification.

My invention relates to parachutes and one of the objects of the invention is the provision of a parachute which will not oscillate or swing in the air. Another object of the invention is to provide a parachute which with a given load will land at slower speed. Another object of the invention is the provision of a parachute having an automatically operated vent so that when it opens, the sudden impact of the air is resiliently absorbed, the pressure relieved, and tearing is avoided. It will be apparent from the above named objects that the general purpose of the parachute of my invention is the achievement of a high degree of safety in apparatus of the class described.

My invention possesses other objects and features of advantage, some of which, with the foregoing, will be set forth in the following description of my invention. It is to be understood that I do not limit myself to the showing made by the said description, as I may adopt variant forms of my invention within the scope of the claims.

Figure 1:
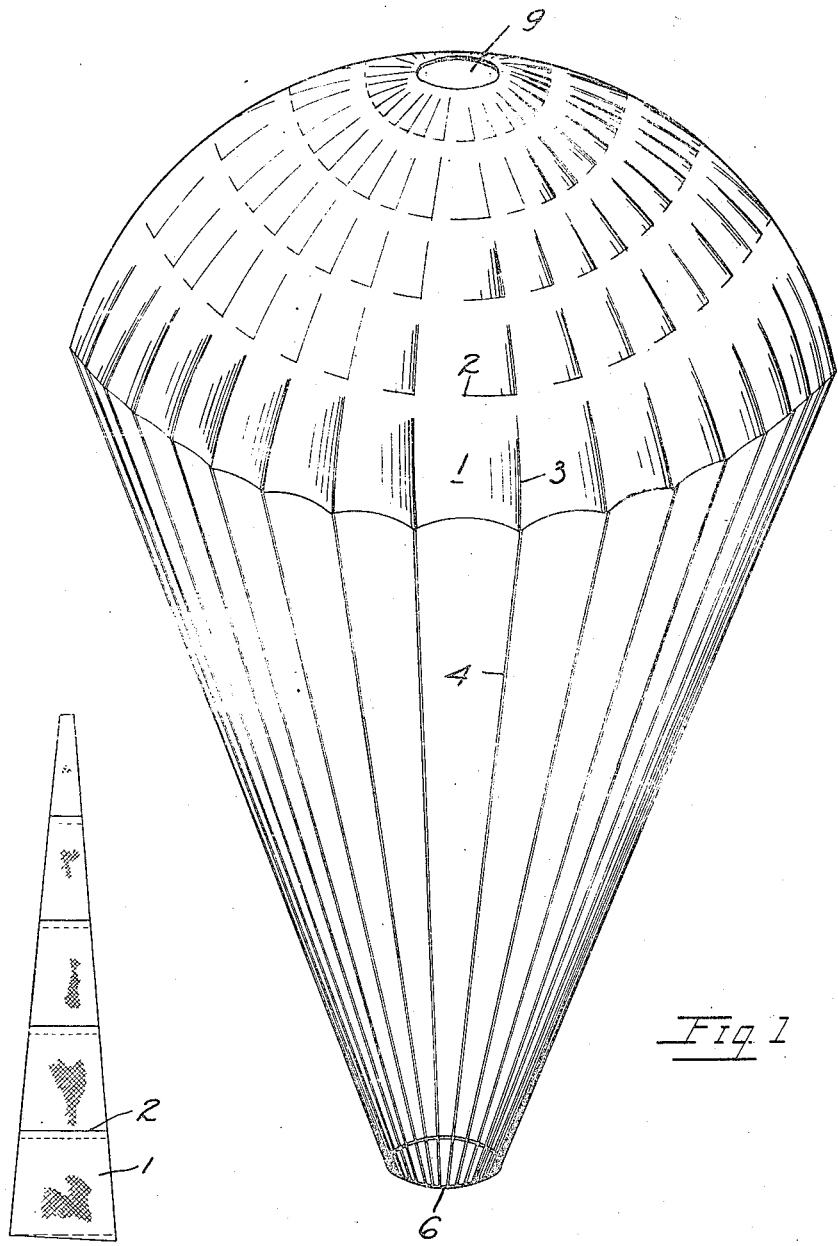
Figure 2:
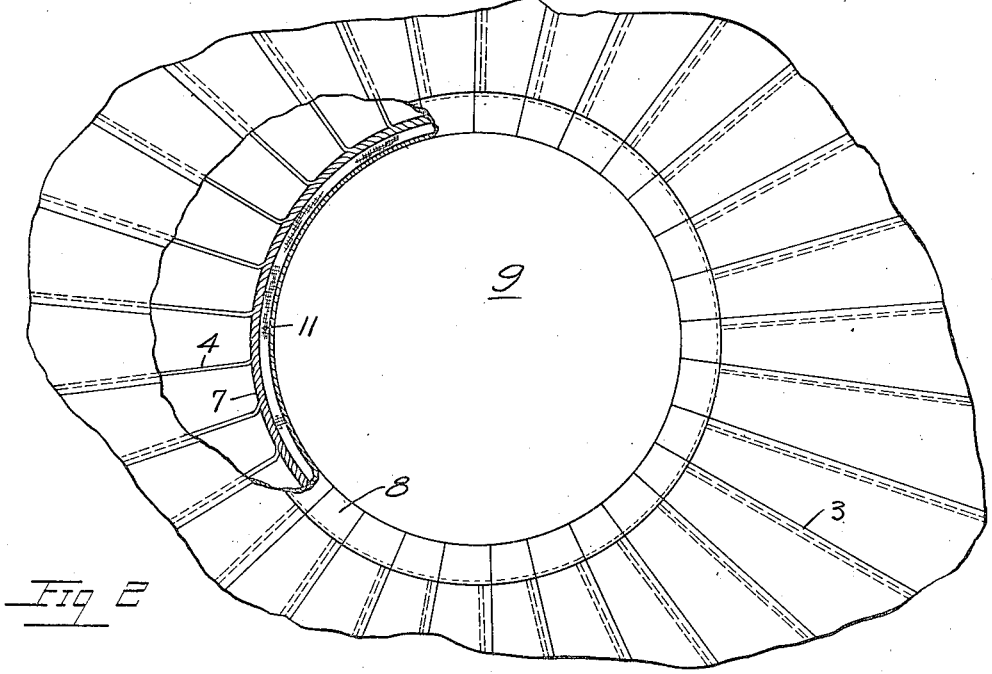
Figure 3:
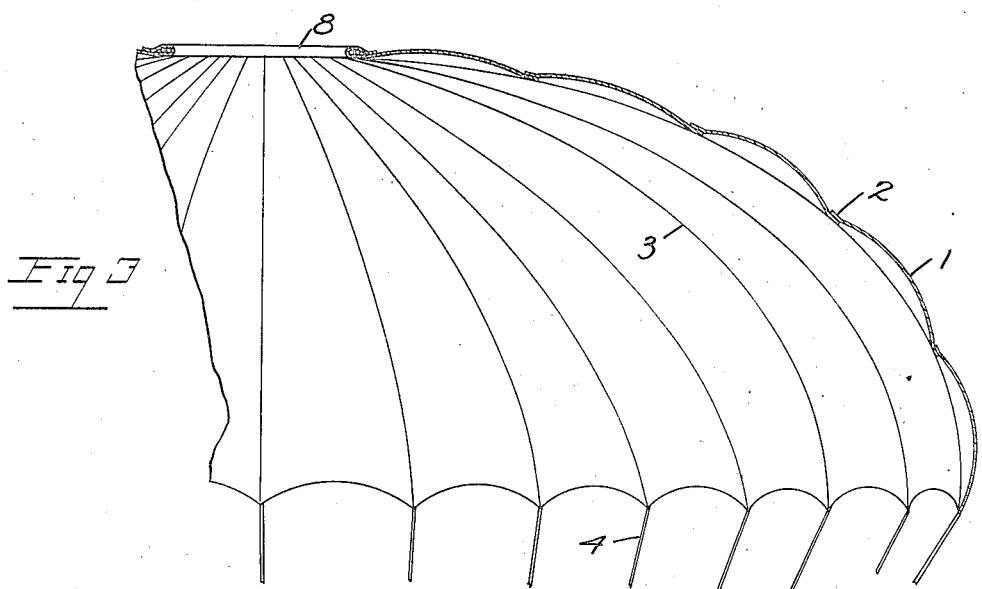

In the drawings: Fig. 1 is a perspective view of the parachute open in the air. Fig. 2 is a plan view of a portion of the parachute around the vent. Fig. 3 is a vertical sectional view thru one side of the open parachute. Fig. 4 is a plan view of one of the segments of the parachute.

The parachute of my invention comprises a concavo-convex sheet preferably formed of silk. The parachute is made from segments as illustrated in Fig. 4 comprising panels 1 which are cut on the bias, and united in seams 2. The edges of the segments are united in seams 3 and these seams are formed so as to loosely include the supporting lines 4 which extend from the carriage ring 6 upwardly to the lower edge of the parachute where they are attached to the material of the sheet, thence thru the seams to the head of the parachute where they are again attached to a loop 7 which lies in the hemmed edge 8 of a vent 9. Also disposed in the vent hem 8 is an elastic or resilient cord 11 which tends to restrict the size of the vent.

The length of line along each edge of a segment is a small amount shorter than the corresponding edge of the segment so that there is a fullness of material between the lower edge and the head of the parachute when it is distended and the supporting lines are taut. Each of the seams 2 forms a connection between adjacent lines, and one which is inelastic. The structure described permits each panel to form a pocket when the parachute is distended, and the proportions are such that the amount of bellying or depth of pocket is greater in the center of each segment. In a thirty foot parachute I prefer to use five panels to each section of which there are thirty. Preferably the lower and middle panels as shown in Fig. 3, in somewhat exaggerated form, are proportioned to give the deepest pocket. The depth of the second panel from each end is slightly less and the upper panel is shallowest of all.

The sections and lines arranged in the edges thereof are formed in groups, the lines in each group progressively shortening. The length of the segments remains unchanged. The effect of this structure is to give a little greater fullness or depth of pocket as the length of the lines decrease in each group. The result in operation is to direct the air in spiral lines from the lower edge of the parachute toward the head, the fabric of the sections adjusting itself to the stresses of the air by movements of relatively slight extent on the line 4 between the lower edge and the head.

The vent 9 is normally restricted by the resilient means 11 enclosed in the hem 8, but in operation, the vent opens and contracts in accordance with the varying air pressures below the parachute. If the parachute is used in a jump from an airplane, the sudden shock of opening is relieved by the expanding vent. The action is entirely automatic and the effect is to relieve the parachute of stresses, which many times in the past, have proved fatal to the aeronaut.

Because of the bellying effect of the various panels a greater surface is presented to the air and it is found that for a given spread or diameter of the open parachute a greater weight may be carried and the landing will be at a slower speed.

In making drops with the parachute of my invention the parachutist does not swing in the air but falls straight. Disastrous landings may therefore be avoided and with due regard for wind currents the landing spot may be selected with reasonable accuracy.

My parachute is also stable under adverse weather conditions and I have used it successfully and without oscillation in a forty-five mile wind.

I claim:

1. A parachute comprising a concavo-convex sheet having a vent in the head thereof and formed of a plurality of segments; elastic means for restricting the size of the vent; non-elastic means around said vent; and lines for supporting the weight of a passenger slidably arranged along the edges of the segments and secured to the non-elastic means around the vent and to the ends of the segments, each of said lines being shorter than the corresponding segment edge.

2. A parachute comprising a concavo-convex sheet having a vent in the head thereof and formed of a plurality of segments; elastic means for restricting the size of the vent; non-elastic means around said vent; and a plurality of groups of lines for supporting the weight of a passenger slidably arranged along the edges of the segments and secured to the non-elastic means around the vent and to the ends of the segments, each of said lines being shorter than the corresponding segment edge and the lines of each group shortening progressively.

3. A parachute comprising a concavo-convex sheet formed of a plurality of segments, and lines for supporting the weight of the passenger extending along the edges of the segments, each of said lines being shorter than the corresponding segment edge.

4. A parachute comprising a concavo-convex sheet formed of a plurality of segments, and lines for supporting the weight of the passenger slidably arranged along the edges of the segments and secured to the ends thereof, each of said lines being shorter than the corresponding segment edge.

5. A parachute comprising a concavo-convex sheet formed of a plurality of segments, and a plurality of groups of lines for for supporting the weight of the passenger slidably arranged along the edges of the segments and secured to the ends thereof, each of said lines being shorter than the corresponding segment edge and the lines of each group shortening progressively.

6. A parachute comprising a concavo-convex sheet having a vent in the head thereof and formed of a plurality of segments, each segment formed of a plurality of bellying panels; elastic means for restricting the size of the vent; non-elastic means around said vent; and a plurality of groups of lines for supporting the weight of a passenger slidably arranged along the edges of the segments and secured to the non-elastic means around the vent and to the ends of the segments; each of said lines being shorter than the corresponding segment edge and the lines of each group shortening progressively.

7. A parachute comprising a concavo-convex sheet having a vent in the head thereof and formed of a plurality of said segments, each segment formed of a plurality of bellying bias-cut fabric panels; resilient means for restricting the size of the vent; non-resilient means for regulating the size of the vent; and a plurality of groups of supporting lines slidably arranged along the edges of the segments and secured to the non-resilient means around the vent and to the ends of the segments, the supporting lines of each group shortening progressively.

8. A parachute comprising a concavo-convex sheet having a vent in the head thereof and formed with a plurality of segments, each segment formed of a plurality of bellying bias-cut fabric panels, resilient means for restricting the size of the vent, and supporting lines slidably mounted along the edges of said segments and attached to the ends thereof.

In testimony whereof, I have hereunto set my hand.

CHARLES BROADWICK.